United States Patent [19]
Wiers

[11] 3,753,096
[45] Aug. 14, 1973

[54] EDDY CURRENT FLAW DETECTION SYSTEM WITH LEFT OFF COMPENSATION
[75] Inventor: William Charles Wiers, Ann Arbor, Mich.
[73] Assignee: Automation Industries, Inc., Century City, Calif.
[22] Filed: Feb. 4, 1971
[21] Appl. No.: 112,710

[52] U.S. Cl. .............................................. 324/40
[51] Int. Cl. ............................................ G01r 33/12
[58] Field of Search ........................... 324/37, 40, 41

[56] References Cited
UNITED STATES PATENTS

| 3,197,693 | 7/1965 | Libby | 324/40 |
| 2,033,654 | 3/1936 | Selquist et al. | 324/40 |
| 2,162,710 | 6/1939 | Gunn | 324/37 |
| 2,321,356 | 6/1943 | Berman | 324/41 |
| 3,528,004 | 9/1970 | Ratabami | 324/41 |

Primary Examiner—Robert J. Corcoran
Attorney—Dan R. Sadler

[57] ABSTRACT

A nondestructive testing system of the eddy current variety is disclosed herein for inspecting workpieces for defects. A search unit is provided for use with the system for inducing eddy currents on the surface of the workpiece and sensing the fields reradiated from such currents to produce a corresponding test signal. The search unit includes one or more magnetic cores and one or more windings which are constructed and arranged to improve the response characteristics of the search unit to discontinuities in the surface of the workpiece. Also, they are constructed and arranged to eliminate or at least drastically reduce variations in the search unit response characteristics resulting from variations in the lift-off distance, i.e., the space between the search unit and the surface of the workpiece.

7 Claims, 5 Drawing Figures

PATENTED AUG 14 1973

William C. Wiers,
INVENTOR.

BY.

ATTORNEY.

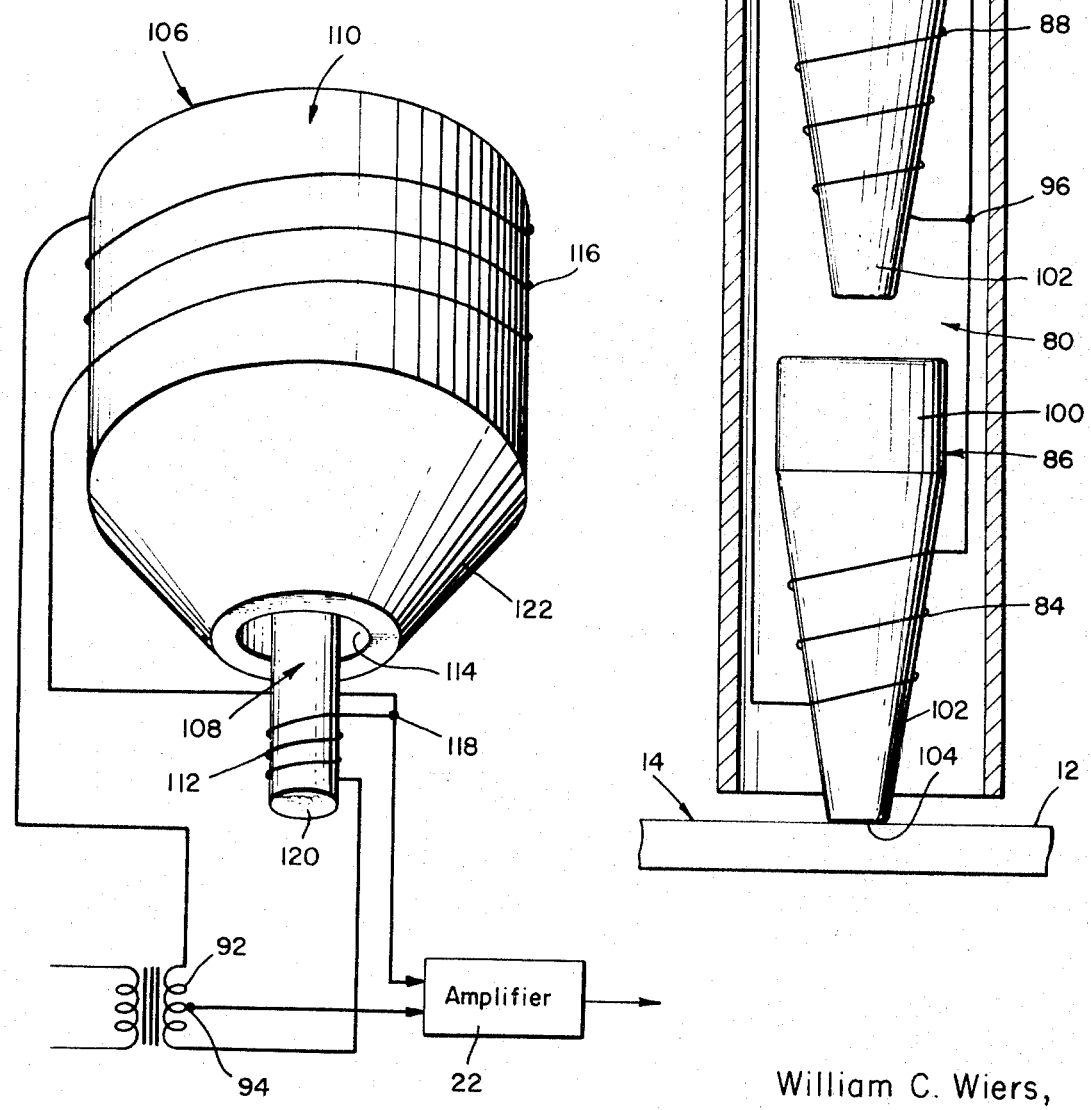

3,753,096

EDDY CURRENT FLAW DETECTION SYSTEM WITH LEFT OFF COMPENSATION

BACKGROUND

It is frequently desirable to inspect the surface of a workpiece for various types of discontinuities such as surface cracks, metallurgical composition, variations in the metallurgical compositions, heat treatments, variations in the heat treatments, etc. One means of accomplishing this is to employ a so-called eddy current type of nondestructive testing system. In a system of this nature a search unit is provided for scanning across the surface of the workpiece. A driving coil or winding in the search unit radiates an alternating magnetic field which is effective to induce eddy currents on the surface.

The magnitude, distribution and phase displacement of the eddy currents are in part determined by the surface characteristics of the workpiece. If the characteristics of the workpiece are uniform, the eddy currents will remain correspondingly uniform. However, if there is a variation or discontinuity within the workpiece, there will be a corresponding variation in the eddy currents.

The eddy currents, their magnitude, distribution phase, etc., are measured by measuring the magnitude, distribution phase, etc., of the magnetic field reradiated by the eddy currents. The first or driving coil in the search unit (or in the alternative a second or pickup coil) senses the fields reradiated by the eddy currents and produces a corresponding electrical or test signal.

The magnitude of the eddy currents induced within the workpiece and their distribution are also a function of the lift-off distance (i.e., the space between the search unit and the surface of the workpiece). As the lift-off distance increases, the magnitude of the eddy currents decreases and also, generally speaking, the size of the eddy current pattern increases.

Moreover, the sensitivity of the search unit to the reradiated fields is also a function of the lift-off distance. As the lift-off distance increases, the magnitude of the received magnetic field and the resultant test signal decrease. The variations in the response characteristics (both as to sensitivity and resolution) are a non-linear function of the lift-off distance. Accordingly, even very small changes in the lift-off distance may produce variations in the signals which are far greater than the test signal to be measured.

In the past various forms of search units and configurations of the cores and windings therein have been proposed in attempts to overcome these difficulties. It has been found that as the length of the core decreases there is an improvement in the ratio between the response to a crack, etc., and the response to variations in the lift-off. It has also been found that as the diameter of the core decreases, there is an increase in the phase angle between a signal created by the response to a defect, such as a crack, etc., and the signal created by the response to variations in the lift-off.

Accordingly, heretofore it has been customary to reduce the length and diameter of the core in an effort to reduce the lift-off variations and/or to eliminate the consequences of lift-off variations by some form of phase filtering or discrimination.

However, as the length and diameter of the core decrease, the overall response and sensitivity characteristics of the entire search unit and system are drastically reduced. Accordingly, there are practical limits beyond which it is impossible to shorten or decrease the diameter of the core.

SUMMARY

The present invention provides means for overcoming the foregoing difficulties. More particularly, the invention is particularly adapted to be embodied in a search unit for an eddy current type of nondestructive testing system. The search unit is constructed and arranged to drastically reduce its sensitivity to variations in the lift-off or distance between the search unit and the surface of the workpiece. At the same time the sensitivity of the search unit to discontinuities and its ability to resolve such discontinuities is greatly improved.

In one embodiment of the search unit disclosed herein, one or more windings are provided on a ferromagnetic core. The core includes a tapered segment which forms a face with a small area for resolving small defects. The core also includes a segment with a large diameter whereby the search unit has a high sensitivity.

In another embodiment of the search unit disclosed herein, a central ferromagnetic core is disposed within and at least partially surrounded by a larger ferromagnetic core. A small inner coil is provided on the inner core and a large outer coil is provided on the outer core. One end of the inner core projects slightly beyond the end of the outer core and forms a face with a small area for coupling the inner coil to a small area of the surface for resolving small defects.

DRAWINGS

FIG. 4 is a cross-sectional view of an eddy current search unit adapted for use with a system of the type shown in FIG. 1 and embodying one form of the present invention.

FIG. 5 is a perspective view of an eddy current search unit embodying another form of the present invention.

DESCRIPTION

Figure 1:
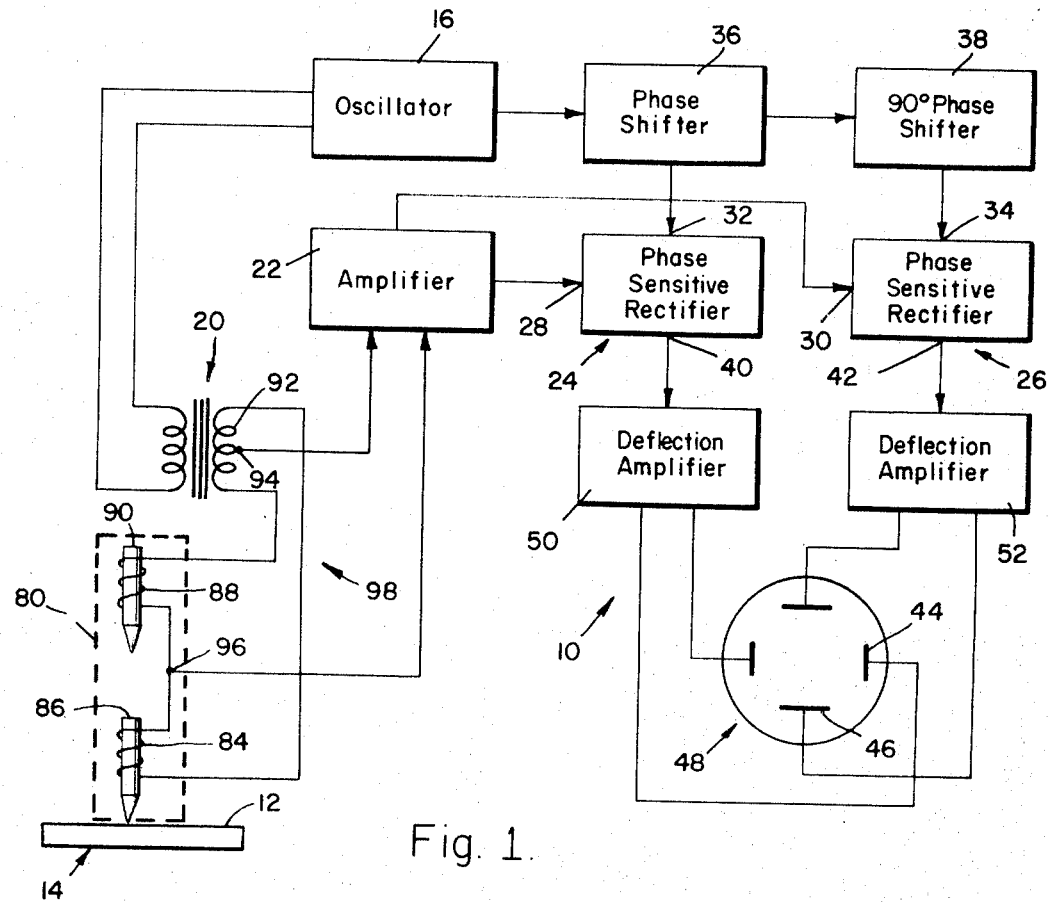
FIG. 1 is a block diagram of an eddy current system embodying one form of the present invention.

Referring to the drawings in more detail, the present invention is particularly adapted to be embodied in a non-destructive testing system 10 for inspecting the surface 12 of a workpiece 14 for defects.

The present system 10 includes an oscillator 16 for generating an alternating signal. This signal is used for controlling the operation of the entire system 10. Its frequency is not particularly critical. It is selected for producing eddy currents that penetrate to the desired depth in the workpiece, and provides a good response to the type of characteristic or discontinuity which is of interest. It may be in a range of just a few cycles per second on up to several megacycles per second or higher.

One of the outputs from the oscillator 16 is coupled to a search unit 80 by means of a transformer 20 whereby the search unit 80 is driven by the driving signal from the oscillator 16. The search unit 80 is effective to create eddy currents on the surface 12 of the workpiece 14. The distribution of the eddy currents, the magnitude of the currents, their phase angle relative to the driving signal, etc., are all functions of the characteristics of the workpiece. They are also functions of the lift-off distance between the search unit and the surface of the workpiece.

The search unit 80 is responsive to the fields reradiated by the eddy currents and provides a test signal which corresponds to the eddy currents. The magnitude, phase angle, etc., of the test signal are functions of the eddy currents and, therefore, of the characteristics of the workpiece. They are also a function of the lift-off distance between the search unit and the surface of the workpiece.

An amplifier 22 is coupled to the search unit 80 for increasing the amplitude of the test signal to a more useful level. Means are coupled to the output of the amplifier 22 so as to be responsive to the amplified test signal for indicating the characteristics of the workpiece 14. In the present instance the means employed is effective to resolve the test signal into a pair of orthogonal components and indicate their amplitude, etc.

More particularly, a pair of phase-sensitive rectifiers 24 and 26 have their signal inputs 28 and 30 coupled to the output of the amplifier 22 whereby the test signal is coupled thereto. The control input 32 for the first rectifier 24 is coupled to the oscillator 16 by means of a phase shifter 36. Normally, this phase shifter 36 is manually adjustable. The control input 34 for the second rectifier 26 is coupled to the first phase shifter 36 by means of a second phase shifter 38. Normally this shifter 38 is preset to provide a ninety-degree shift.

It will be seen that by this arrangement the test signal will be resolved in the first rectifier 24 into a first component on the first output 40 and in the second rectifier 26 into a second component on the second output 42. Either one or both of these components may be used to indicate the characteristics of the workpiece.

However, in the present instance the two outputs 40 and 42 are coupled to the horizontal deflection plates 44 and vertical deflection plates 46 of a cathode ray tube 48 by means of horizontal and vertical deflection amplifiers 50 and 52. This will result in a bright spot on the face of the tube 48. The position of this bright spot is a function of the two components of the test signal. By varying the amount of phase shift in the first shifter 36, it is possible to select one or both of the components so as to be a function of just the characteristic or characteristics of interest.

Figure 2:
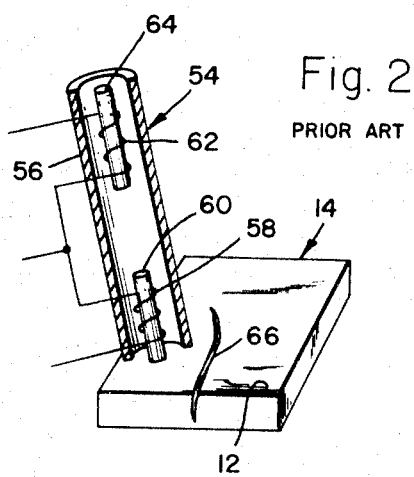
FIG. 2 is a combination perspective cross-sectional view of a prior art eddy current search unit suitable for being employed with eddy current nondestructive testing systems.
Figure 3:
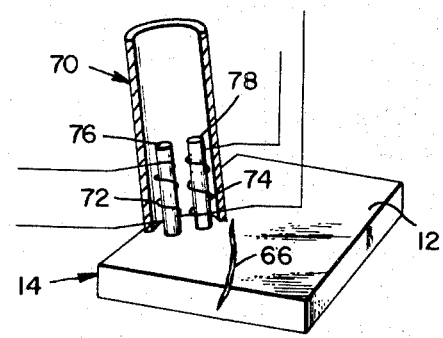
FIG. 3 is a combination perspective cross-sectional view similar to FIG. 2 but of another form of prior art eddy current search unit.

Heretofore, the search unit 80 has been similar to that shown in FIG. 2 or that shown in FIG. 3. The search unit in FIG. 2 is of the absolute variety, i.e., the test signal is a function of the absolute value of the characteristics of the workpiece. In contrast, the search unit of FIG. 3 is of the differential variety, i.e., the test signal is a function of the difference between the characteristics of the workpiece at two adjacent points.

The search unit 54 of FIG. 2 is enclosed in a cylindrical housing 56 which may be hand-held or mounted in a machine for scanning the surface. One end of the search unit 54 is adapted to act as a face for being disposed adjacent the surface 12 of the workpiece 14.

A first coil 58 is disposed within the housing 56 whereby an alternating signal in the coil 58 will induce eddy currents on the surface of the workpiece 14. In addition, any eddy currents on the surface 12 of the workpiece 14 will induce a signal in the coil 58. In order to increase the coupling between the coil 58 and the workpiece, 14, a cylindrical core 60 of ferromagnetic material may be provided inside of the coil 58 so as to project to or through the face of te search unit 54. The core 60 is cylindrical and has a diameter which is uniform over its entire length. The face or end of the core 60 has the same diameter as the rest of the core 60.

The phase and magnitude of the eddy currents relative to the driving signal from the oscillator 16 and the phase and magnitude of the test signal induced in the coil 58 are functions of several different factors such as the spacing of the face from the workpiece 14 (i.e., the lift-off distance) and the characteristics of the workpiece 14 (i.e., the conductivity and permeability, etc., of the material.)

A single coil 58 and core 60 as described above may be used. However, under these circumstances the signal normally produced in the coil 58 will be extremely large and the test signal which is of interest will be represented by relatively small variations in this signal. To avoid this difficulty a second coil 62 and core 64 have been provided at the opposite end of the housing 56. The coil 62 and core 64 are sufficiently remote from the workpiece to be substantially independent thereof.

By properly balancing these coils 58 and 62, the signal from the search unit 54 will be primarily a function of the unbalance between the two coils 58 and 62. This, in turn, will be a function of the characteristics of the workpiece 14. If the search unit scans across a uniform surface, the test signal is constant. However, if the search unit 54 passes over a crack 66, the inductive characteristics of the coil 58 change while those of the coil 62 do not. As a consequence, the test signal varies.

When the lift-off distance between the end of the core 60 and the surface 12 varies, there is a corresponding variation in the amplitude of the signal. Unfortunately, the variations in the signal resulting from such a variation in the lift-off distance can be greatly in excess of the variations produced by passing over the crack 66, etc.

One means of compensating for this effect has been to make the core 60 short and/or to make its diameter small. As the length of the core 60 decreases, the ratio between the amplitude of a test signal and the lift-off signal increases. Thus, shortening the core improves the lift-off ratio (i.e., the ratio of the defect response relative to the lift-off response).

The test signal produced by a defect such as crack, etc., and the lift-off signal produced by variations in the lift-off distance are at different phase angles. The smaller the diameter of the core the greater this phase differential. Accordingly, by reducing the diameter of the core it is possible to greatly improve the phase angle differential. Therefore, by using a small diameter core and selecting the proper phase shift in the shifter, the components from one of the phase-sensitive rectifiers may be made reasonably independent of the lift-off effects over a limited portion of the liftoff range.

Although the response characteristics of the search unit may be improved by reducing the length and diameter of the core, the amount of coupling between the coil and the workpiece is also reduced. Accordingly, the overall response characteristics of the entire search unit (i.e., sensitivity and resolution, etc.) are also degraded.

The prior art search unit 70 of FIG. 3 is very similar to that shown in FIG. 2. The primary difference between the two search units 54 and 70 is that in this configuration the two sets of coils 72–74 and cores 76–78 are disposed side-by-side. This configuration is the so-called differential type. A search unit of this type is only responsive to the differences between the two areas of the surface 12 aligned with the two faces of the cores 76 and 78.

If the two areas aligned with the cores 76 and 78 are identical, the two coils 72 and 74 will be loaded identically. There will be no difference signal. This is true even though the lift-off distance varies. As this search unit 70 moves toward and away from the surface 12, the changes on the two coils 72 and 74 will be identical. Therefore, they remain balanced and no lift-off signal results.

However, if the search unit 70 is tilted slightly from a true vertical position, one of the coils 72 or 74 must inherently have a greater lift-off than the other coil. As a consequence, even though the amount of tilting is small, the resultant signal produced is very large.

In addition, in the differential type of search unit 70, if the faces of the two cores 76 and 78 pass over a crack at the same time, they will both be affected by substantially the same amount. Under these circumstances, no signal will be produced and the crack will not be detected.

The search unit 80 used in the system of FIG. 1 eliminates the foregoing difficulties which are inherent in the prior art search units 54 and 70.

As best seen in FIG. 4, the search unit 80 includes a substantially cylindrical housing 82. A first coil 84 and a first core 86 are disposed in one end of the housing 82 for being coupled to the surface 12 of the workpiece 14.

The search unit 80 may have only the single coil 84 and single core 86. Under these circumstances there will be a signal with the characteristics of the workpiece being represented by changes in the signal. These changes are relatively small percentagewise and therefore are difficult to accurately detect and measure. To avoid this difficulty a balancing signal may be provided to balance out the foregoing irrelevant portions of the signal. This leaves a very small signal whereby any changes in the signal as a result of the variations in the workpiece are very large percentagewise.

The balancing signal may be obtained from any suitable source. However, in the present instance a second coil 88 and core 90 are provided within the housing 82. The coil 88 and core 90 are adjacent the rear end of the housing so as to be maintained remote from the effects of the workpiece 14. The electrical characteristics of the cores 86 and 90 and coils 84 and 88 are substantially identical whereby the balancing signal from the coil 88 will match the signal from the coil 84. In the present instance this is accomplished by making the coils and cores substantially identical physically.

The two coils 84 and 88 are connected in series with each other and across the opposite ends of the secondary 92 for the transformer 20. The center tap 94 on the secondary 92 and the junction 96 between the two coils 84 and 88 are connected to the input of the amplifier 22.

It may be appreciated the two coils 84 and 88 together with the opposite parts of the secondary 92 form a bridge 98. If the search unit 80 is remote from the workpiece 14, neither of the coils 84 or 88 will be affected by the workpiece 14. However, if the face of the search unit approaches and/or contacts the surface of the workpiece, the first coil 84 will be loaded by the workpiece 14 while the second coil 88 remains unloaded or affected by the workpiece.

It can be appreciated the two coils 84 and 86 may be matched within the search unit 80 and/or within the system 10 when the search unit is against the surface 12 of the workpiece 14 or some predetermined distance therefrom. Under these circumstances, the signal resulting from unbalancing the bridge 98 will be primarily a function of just the characteristics of the workpiece adjacent the face of the search unit.

In this particular embodiment the two coils 84 and 88 and the two cores 86 and 90 are substantially identical. However, as may be seen from the embodiment of FIG. 5 they do not have to be identical.

Each of the cores 86 and 90 includes an enlarged head portion 100 and a tapered portion 102. The volume of material in the core 86 is preferably sufficiently large enough to insure a high degree of coupling between the workpiece 14 and the coil 84. The head 100 is normally substantially cylindrical and of a large diameter.

The large end of the tapered portion 102 has a diameter which is substantially identical to the diameter of the head 100. The diameter of this portion 102 tapers from the large size down to a small apex or face 104. The small diameter of this apex or face 104 insures the coil 84 being coupled to a very small area on the surface 12 of the workpiece 14.

The exact dimensions and proportions of the core 86 are not believed to be critical. However, by way of example, the apex or face 104 of the core 86 may be on the order of 0.010 to 0.025 inches in diameter. As a consequence, the core 86 is coupled to only a very small area on the surface 12 of the workpiece 14. This insures the coil 84 being very sensitive to any discontinuities of even the smallest size whereby the search unit 80 may resolve very small discontinuities.

The conical or tapered portion 102 extends from this small face 104 up to a diameter similar to that of the head portion 100. This larger diameter may be on the order of the diameter of a core in the prior art search units such as 54 or 70. By way of example, this may be in the range of 0.048 to 0.062 inches in diameter. Normally, the portion 102 tapers substantially uniformly over its entire length.

It has been found desirable for the length of the tapered portion 102 to be on the order of at least half of the overall length of the core 86 and preferably somewhat longer. By way of example, the overall length of the core 86 may be on the order of 0.090 to 0.250 inches long. Under these circumstances the length of the tapered portion 102 would be on the order of about one-half to about two-thirds of the overall length.

It has been found that by increasing the volume of the core 86, the diameters of the core 86 and particularly of the head portion 100, the length of the tapered portion 102 and/or the overall length of the core 86, the degree of coupling is increased whereby the coil 84 is more sensitive to the reradiated eddy currents over a longer lift-off distance. However, it has been found that the shorter the core 86 the less the sensitivity to the lift-off spacing and accordingly the greater the lift-off ratio.

As an alternative, the search unit 106 shown in FIG. 5 may be employed. Although this search unit 106 may have some similarities to the differential type of prior art search unit 70 shown in FIG. 3, it is not a differential type of search unit. Rather it is in reality an absolute type.

This search unit 106 includes two cores 108 and 110 of ferromagnetic material. The first core 108 is an inside or center element. This core 108 may be a cylinder having a substantially uniform diameter over its entire length. However, it has also been found that under some circumstances it is desirable for the core 108 to be tapered similar to the cores 86 and 90 shown in FIG. 4.

A first coil 112 is wound upon this core 108 for energizing the core 108 and receiving the reradiated fields. If desired a second coil may be provided on the core whereby one of the coils is used to energize or induce the eddy currents, and the other is used to receive the reradiated field and produce the test signal.

The second core 110 is an outer core and is considerably larger than the first or inner core 108. The core 110 includes an opening or passage 114 which extends axially inwardly from one end thereof. The first or inner core 108 is disposed within this passage 114 and is substantially axially aligned therewith.

A second coil 116 is wound upon the outside of the second core 110. The two coils 112 and 116 are connected in series with each other and across the secondary of the transformer 20. The signal inputs of the amplifier 22 are coupled between the center tap 94 of the secondary 92 and the junction 118 between the two coils. This is all essentially the same as in the first search unit.

Certain characteristics of the coil 112 on the center core 108 are closely matched to certain characteristics of the coil 116 on the outer core 110. This will provide a bridge circuit which is electrically balanced similar to the prior embodiments.

The maximum outside diameter of the first core 108 is smaller than the inside diameter of the passage 114 in the second core 110. The difference between the two diameters is preferably adequate to insure the first core 108 being sufficiently isolated from the second core 110 to permit the two cores 108 and 110 and the coils 112 and 116 thereon acting separately. In other words, they do not function as a single element having but one magnetic field.

It may be observed the second core 110 has a large diameter and a substantial volume. As a result the second coil 116 on the core 110 is closely coupled to the surface 12 of the workpiece 14 even though it may be separated therefrom by a substantial distance.

Also because of the large volume and diameter of the core 110, the coil 116 is coupled to the workpiece 14 over a fairly large area. As a consequence, the coil 116 will be relatively insensitive to any discontinuities such as cracks, etc. However, the coil 116 will still be sensitive to variations in the lift-off distance between the end of the core 110 and the surface 12 of the workpiece 14.

Conversely, the inner core 108 being of a smaller diameter is coupled to a very small area on the surface 12 of the workpiece 14. AS a consequence, it is very sensitive to any discontinuities even though they may have a size comparable to the area of the face 120 on the end of the core 108. However, it will be relatively insensitive to variations in the lift-off distance.

By a proper balancing of the relative volumes of the two cores 108 and 110, their dimensions and relative positions, the inner coil 112 may be made very sensitive to defects of even the smallest size while the outside coil 116 is relatively insensitive to defects of any size. As a consequence, when the search unit 106 passes over a defect, the changes in the inside coil 112 will unbalance the bridge and produce a test signal corresponding thereto.

At the same time, the sensitivity of the two coils 112 and 116 to the lift-off dimension may be made substantially identical. At least they will closely match each other over the normal working range of the lift-off. As a result, the normal variations in the lift-off distance will not materially unbalance the bridge nor cause any variations in the signals.

The outer core 110 has a volumen which is considerably larger than the volume of the inner core 108 and as a consequence, will tend to more closely couple the coil 116 to the workpiece. Accordingly, the proximity of the search unit to the workpiece will tend to have a greater effect on the uter coil 116 than on the inner coil 112. In order to compensate for this, the outer end of the center core 108 normally protrudes somewhat beyond the end of the outer core 110. This makes the face 120 of the core 108 considerably closer to the surface of the workpiece than the end of the core 110 whereby the two degrees of coupling between the coil 112 and the coil 116 relative to the workpiece are matched.

Where the search unit 106 is to be used with a wide variety of materials, it may be desirable to provide some form of adjustment whereby the element 108 may be moved axially within the outer element 110. This permits varying the amount by which the face 120 protrudes beyond the core 110 and therefore varying the ratio between the degrees of coupling. Accordingly, by adjusting the relative axial portion of the inner core 108, it is possible to prevent over or under compensation.

Although the end of the core 110 may be flat, it has also been found that under some circumstances it may be desirable to provide a beveled or tapered region 122 on the end of the outer core 110. When the search unit 106 is inclined or oblique to the surface 12, the spacing or lift-off distance on one side of the outer core 110 increases while the distance on the diametrically opposite side decreases. By selecting a properly proportioned bevel the effect of the increase in spacing on one side will balance the decrease in the spacing on the opposite. As a consequence, the net effect from tilting will be negligible whereby no overall effect will occur.

While only a limited number of embodiments of the present invention have been disclosed herein, it will be readily apparent to persons skilled in the art that numerous changes and modifications may be made thereto without departing from the spirit of the invention. Accordingly, the foregoing disclosure and description thereof are for illustrative purposes only and do not in any way limit the invention which is defined only by the claims which follow.

I claim:

1. An eddy current probe for inspecting a work-piece for defects, said probe including the combination of:

a first ferromagnetic core having an opening therein defining an inside diameter, a second ferromagnetic core having an outside diameter smaller than said inside diameter of the first core, said first core having a volume greater than that of said second core, said second core being at least partially disposed within said opening of the first core, a first winding on said first core, a second winding on second core, and electrical bridge means including the connection of said first and second windings as normally balanced windings of said bridge means, whereby electrical variation of both the first and second windings to lift-off of the probe are substantially the same to maintain the bridge means in a balanced condition whereas the second winding is substantially more sensitive to workpiece defects than the first winding so as to cause an unbalanced condition of said bridge means.

2. The combination set forth in claim 1, further defined by said inside diameter of the first core being substantially larger than said outside diameter of said second core such that the first and second cores and their associated first and second windings exhibit substantially independent magnetic fields.

3. A non-destructive eddy current testing system including:

a probe having inner and outer coaxially arranged annular cores of ferromagnetic material, each core having an associated coil wound thereon, and electrical bridge means for connecting said probe coils to electrical instrumentation, said bridge means including means for connecting said outer core coil and said inner core coil as normally balanced windings of said bridge means, whereby said bridge means maintains a substantially balanced electrical condition in response to lift-off of said probe relative to a workpiece and assumes an unbalanced electrical condition in reponse to a greater sensitivity of the inner core coil relative to the sensitivity of the outer core coil to workpiece defects.

4. An eddy current probe for inspecting a workpiece for defects, said probe including the combination of:

a first ferromagnetic core, said core being elongated and having an end portion with a face thereon for being disposed adjacent the workpiece, a first winding means on said core for creating eddy currents in the workpiece and creating a signal corresponding to the influence of such eddy currents on said first core and first winding means, a second ferromagnetic core, said second core at least partially surrounding said first core and spaced therefrom whereby magnetic fields from said first and second cores, are substantially separate from each other, the end portion of said first core protruding beyond a surrounding portion of said second core, second winding means disposed on said second core for creating eddy currents in the workpiece and creating a signal corresponding to the influence of such eddy currents on the second core and second winding means, and electrical bridge circuit including the connection of said first and second winding means as normally balanced windings of the bridge circuit such that said first and second cores and associated first and second windings exhibit substantially the same electrical response to the lift-off of the probe relative to the workpiece so as to maintain the bridge circuit in electrical balance whereas said first core and first winding means exhibit a greater electromagnetic variation in response to workpiece defects than exhibited by the second core and second winding means so as to cause said bridge circuit to assume an unbalanced condition in response to the presence of a defect in the workpiece.

5. An eddy current search unit for inspecting a workpiece, said search unit including the combination:

an inner elongated ferromagnetic core having a face at one end for being positioned adjacent a surface of the workpiece, an outer annular ferromagnetic core disposed coaxially about said inner core, said outer core being substantially radially spaced apart from said inner core whereby the magnetic fields for said inner and outer cores are substantially independent from each other, an inner core winding means disposed on said inner core for inducing eddy currents in the workpiece, an outer core winding means disposed on said outer core for inducing eddy currents in the workpiece, electrical bridge means including the connection of said inner and outer winding means as normally balanced windings of said bridge means, and means responsive to the electrical condition of said bridge means to indicate defects within the workpiece, whereby said bridge means remains substantially balanced in response to lift-off of said inner and outer cores relative to a surface of the workpiece and assumes an unbalanced condition in response to a greater sensitivity of the inner core and inner core winding means to localized defects within the workpiece.

6. The search unit as defined in claim 5, said outer core having a substantially hollow cylindrical configuration with said inner core coaxially mounted therein, the face end of said inner core protruding beyond one axial end of said outer core, said axial end of said outer core having a beveled region, said beveled region being proportioned to balance out differences in the electro-magnetic variations of said winding means to the tilting of the axis of said cores relative to a surface of the workpiece.

7. An eddy current probe for inspecting a work-piece for defects, said probe including the combination of:

a first elongated ferromagnetic core having a first end thereon, a face on said end for being coupled to the workpiece, a second hollow ferromagnetic core, said second core having a volume of ferromagnetic material which is greater than the volume of ferromagnetic material in said first core, a face on said second core for being coupled to the workpiece, said second face being larger than said first face, an opening through said second face, said first core being disposed inside of the second core with said end thereof projecting through said opening whereby said first core is enclosed within said second core except for said end and said first face is positioned closer to said workpiece than said second face, first winding means on said first core for creating eddy currents in said workpiece in a small area corresponding to said first face and creating a signal in response to said eddy currents, second winding means on said second core for creating eddy currents in said workpiece over a large area corresponding to said second face and creating a signal in response to said eddy currents, means interconnecting said first and second winding means whereby electrical variations in the signal from the first and second windings means due to the lift-off between said faces and the workpiece are substantially cancelled whereby the first winding means is more sensitive to workpiece defects than the second winding as a result of an unbalanced condition of said signals resulting from defects in the workpiece.

* * * * *